United States Patent
Laird et al.

(10) Patent No.: US 6,724,778 B1
(45) Date of Patent: Apr. 20, 2004

(54) METHOD AND APPARATUS FOR LONG CODE GENERATION IN SYNCHRONOUS, MULTI-CHIP RATE SYSTEMS

(75) Inventors: Kevin Michael Laird, Keller, TX (US); Jiangnan Chen, Darien, IL (US); Frank Fei Zhou, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/526,643

(22) Filed: Mar. 16, 2000

(51) Int. Cl.[7] ............................................. H04B 1/69
(52) U.S. Cl. ............................. 370/500; 375/130
(58) Field of Search ............................ 370/500, 515; 375/130; 708/250; 714/739

(56) References Cited

U.S. PATENT DOCUMENTS

| | | | | |
|---|---|---|---|---|
| 5,216,693 A | * | 6/1993 | Nakamura | 375/142 |
| 5,878,075 A | * | 3/1999 | Frank et al. | 375/130 |
| 6,055,264 A | * | 4/2000 | Kenney et al. | 375/150 |
| 6,324,205 B1 | * | 11/2001 | Prasad | 375/130 |
| 6,389,138 B1 | * | 5/2002 | Li et al. | 380/35 |

* cited by examiner

Primary Examiner—Chi Pham
Assistant Examiner—Nhat Do
(74) Attorney, Agent, or Firm—Mario J. Donato, Jr.; Jeffrey K. Jacobs

(57) ABSTRACT

A method and apparatus for long code generation in synchronous, multi-chip rate systems, wherein a first code sequence having a first bit rate, and a second code sequence having the first bit rate, the second code sequence being a time delay of the first code sequence, are multiplexed together, producing a desired long code.

3 Claims, 2 Drawing Sheets

METHOD AND APPARATUS FOR LONG CODE GENERATION IN SYNCHRONOUS, MULTI-CHIP RATE SYSTEMS

FIELD OF THE INVENTION

The present invention is related in general to cellular communication systems, and, more particularly, to an improved method and system for long code generation in synchronous, multi-chip rate systems.

BACKGROUND OF THE INVENTION

In synchronous code division multiple access (CDMA) telecommunication systems, a long code generator is initialized by use of the forward link synchronization channel. The long code generator is used to separate users. For example, in the IS-95 system, each user gets a different time shift of the same pseudo noise (PN) sequence, which is the long code. When two synchronized systems are running at multiple and related chip rates, handoffs from one system to the other may be complicated because the state of the long code generator of the new system is not known. For example, CDMA 2000 has a Spreading Rate 1, also known as 1×, having a chip rate of 1.2288 Mcps, and a Spreading Rate 3, also known as 3×, having a chip rate of 3.6864 Mcps. If the same long code generator is used in each system, the long code generator in the 3× system runs three times as fast as the long code generator in the 1× system. This causes a problem when handing off from a 3× system to a 1× system, and vice versa. Due to the synchronous nature of the two systems, it is difficult to download the long code generator state of the new system to the user during handoff.

In the example discussed above, it is optimum to have a 3× long code generator that is derived from the 1× long code generator. In this way, once the mobile station is accessing either system, it knows the long code generator state of the other system, and handoffs are simplified. Therefore, a need exists for an improved method and apparatus for long code generation in a synchronous, multi-chip rate system.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
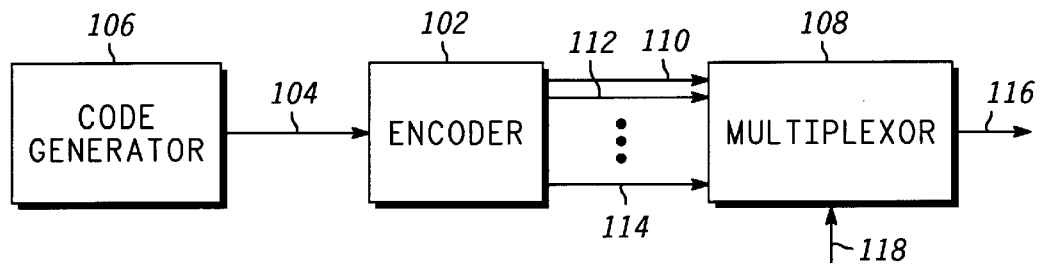
FIG. 1 illustrates a block diagram of an exemplary apparatus in accordance with the present invention illustrating the extension of a 1× chip rate to an N× chip rate.

Referring now to the figures, wherein like referenced numerals designate like components, FIG. 1 illustrates a block diagram of an exemplary apparatus 100 in accordance with the present invention illustrating the extension of a 1× chip rate to an N× chip rate. In accordance with FIG. 1, encoder 102 is concatenated to the output 104 of code generator 106. In the preferred embodiment, code generator 106 includes a long code generator comprising a PN sequence generator. However, it will be appreciated by those skilled in the art that any sequence generator capable of generating a sequence of random bits may be used without departing from the spirit and scope of the present invention. In the preferred embodiment, both the long code generator 106 and the encoder 102 are operated at the same bit or chip rate, which in the preferred embodiment is the 1× or reference chip rate (i.e. 1.2288 Mcps). Encoder 102 encodes code generator output 104, and produces a plurality of component or code sequences 110–114, which are received by multiplexor 108. Multiplexor 108 multiplexes code sequences 110–114 and produces an output code sequence 116. As will be appreciated by those skilled in art, the architecture depicted in FIG. 1 provides the flexibility of extending the long code sequence from the 1× chip rate to any future higher multiple and related chip rate. Multiplexer 108 has clock input 118 operating at N× chip rate so that the output sequence 116 has the desired chip rate.

Figure 2:
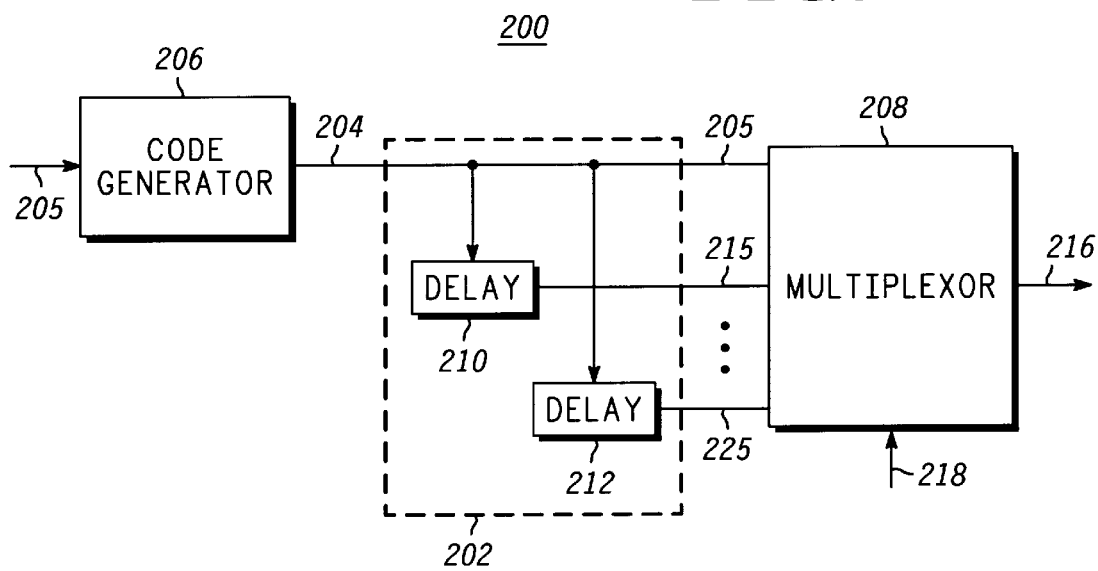
FIG. 2 illustrates a block diagram of an alternate embodiment of an exemplary apparatus in accordance with the present invention illustrating the extension of a 1× chip rate to an N× chip rate.

Referring now to FIG. 2, a block diagram of an alternate embodiment of an exemplary apparatus 200 in accordance with the present invention illustrating an example of a long code generator for spreading rate N is shown. An encoder 202 is concatenated with the output 204 of the long code generator 206, which preferably is running at the 1× chip rate. Encoder 202 encodes code generator output 204, and produces a plurality of component or code sequences 205, 215, 225, which are received by multiplexor 208. Preferably, first component sequence 205 is substantially similar to code generator output 204, and is input to multiplexor 208. However, those skilled in the art will appreciate that first component sequence 205 may be a delayed version of code generator output 204. Second component sequence 215 is a delayed version of code generator output 204, wherein code generator output 204 is delayed by a predetermined amount at delay block 210. Third component sequence 225 is also a delayed version of code generator output 204, wherein code generator output 204 is delayed by a second predetermined amount at delay block 212, wherein the first and second predetermined delays may or may not be the same. As shown in FIG. 2, the long code for spreading rate N comprises N multiplexed component sequences 205, 215, 225, etc., each having a chip rate of 1×. Multiplexor 208 has clock input 218 operating at the N× chip rate so that the output sequence 216 has the desired chip rate.

Figure 3:
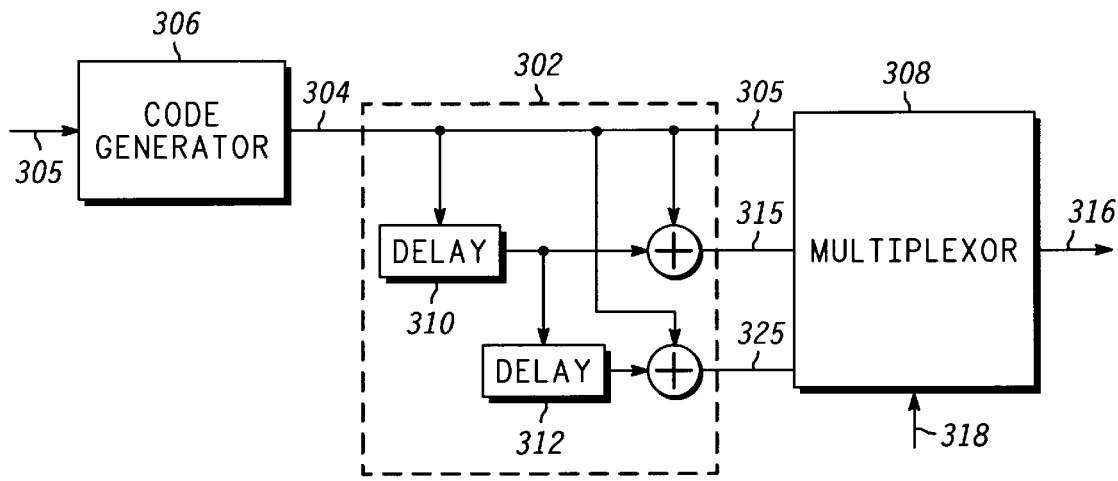
FIG. 3 illustrates a block diagram of an exemplary apparatus in accordance with the present invention illustrating an example of a long code generator for spreading rate 3.

Referring now to FIG. 3, a block diagram of an exemplary apparatus 300 in accordance with the present invention illustrating an example of a long code generator for spreading rate 3 is shown. A code mask 305, which in the preferred embodiment is a long code mask, is input to code generator 306. As described above, code generator 306 is preferably a long code generator. Long code mask 305 is applied over long code generator 306 to generate a specific mobile station's long code sequence. A systematic rate 1/3 convulational encoder 302 is concatenated with the output 304 of the long code generator 306, which is running at the 1× chip rate. Encoder 302 encodes code generator output 304, and produces a plurality of component or code sequences 305, 315, 325, which are received by multiplexor 308. In cdma2000 or TIA IS-2000.2 *Physical layer Standard for cdma2000 Spread Spectrum Systems*, the long code for spreading rate 1 has a chip rate of 1× or 1.2288 Mcps. As shown in FIG. 3, the long code for spreading rate 3 comprises three multiplexed component sequences 305, 315, 325, each having a chip rate of 1.2288 Mcps. The first component sequence 305 comprises the long code for spreading rate 1. The second component sequence 315 comprises the modulo-2 addition of the long code for spreading rate 1 and the long code for spreading rate 1 delayed by a predetermined amount, which in the preferred embodiment is 1/1.2288 microseconds. The third component sequence 325 comprises the modulo-2 addition of the long code for spreading rate 1 and the long code for spreading rate 1 delayed by another predetermined amount, which in the preferred embodiment is 2/1.2288 microseconds. However, other predetermined amounts may be used and still fall within the scope of the present invention. If code generator output 304 is a maximum length pseudonoise sequence, the second and third component sequences 315, 325 are delayed or time-shifted versions of the first component sequence 305. As will be appreciated by those skilled in the art, the delay may be produced via a shift register, a multiplier, etc. However, it should be noted that the length of the shift register may be prohibitive. The three component sequences 305, 315, and 325 are multiplexed by multiplexer 308. Multiplexor 308 multiplexes code sequences 305, 315, 325 and produces an output code sequence 316. In this example, multiplexer 308 runs at a chip rate three times that of spreading rate 1 (i.e. spreading rate 3) via clock input 318. Therefore, the long code for spreading rate 3 will have a chip rate of 3.6864 Mcps. In the preferred embodiment, the three component sequences 305, 315, and 325 are multiplexed such that the long code value at the beginning of every 1/1.2288 microsecond interval, starting from the beginning of the System Time, corresponds to the first component sequence.

As will be appreciated by those skilled in the art, the procedure described above for spreading rate 3 can be extended to generate a long code sequence of any multiple length. For example, a 4× long code sequence may be generated by multiplexing four 1× sequences: the three sequences above and a fourth sequence generated by delaying the long code for spreading rate 1 by yet another predetermined amount, which in the preferred embodiment is three chips or 3/1.2288 microseconds, and exclusive or'ing or performing a modulo-2 addition with spreading rate 1.

Figure 4:
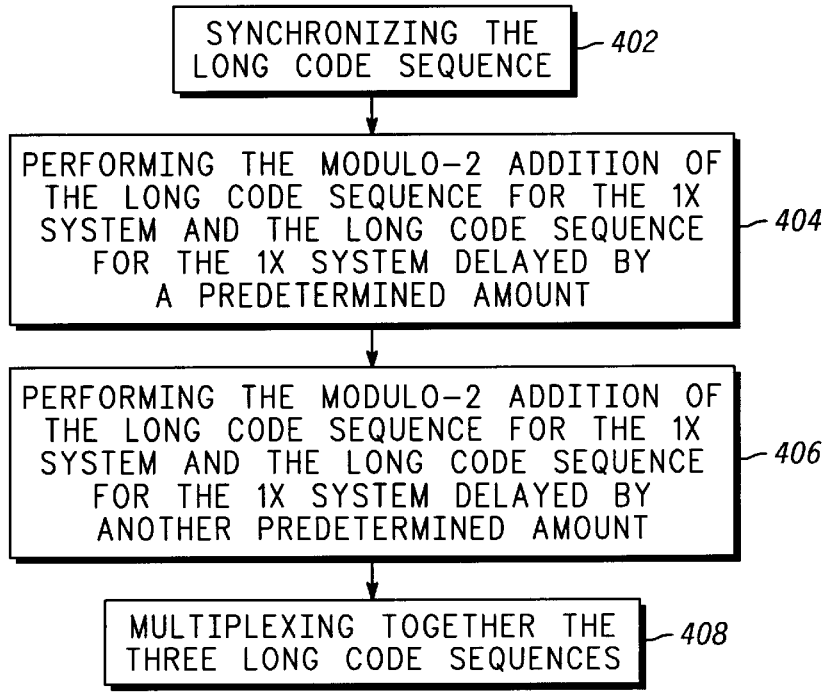
FIG. 4 illustrates a logical flowchart of the method for long code generation according to the method and system of the present invention.

With reference now to FIG. 4, there is depicted a logical flowchart of the process 400 of long code generation according to the method and system of the present invention. As shown, the process begins at block 402, wherein the step of synchronizing to the system long code is performed. Thereafter, as shown at block 404, the step of performing the modulo-2 addition of the long code sequence for the 1× system and the long code sequence for the 1× system delayed by a predetermined amount is performed. Thereafter, as shown at block 406, the step of performing the modulo-2 addition of the long code sequence for the 1× system and the long code sequence for the 1× system delayed by another predetermined amount is performed. Thereafter, as shown at block 408, the step of multiplexing together the three long code sequences is performed, producing the 3× long code sequence.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for long code generation in synchronous, multi-chip rate communication systems, comprising the steps of:
   producing a first long code sequence having a first bit rate;
   producing a second long code sequence having the first bit rate, the second long code sequence being a time delay of the first code sequence;
   producing a third long code sequence having the first bit rate, the third long code sequence being a time delay of the first long code sequence; and
   multiplexing the first long code sequence, the second long code sequence, and the third long code sequence, and producing an output code sequence having a desired bit rate, wherein the step of producing the second long code sequence comprises the step of performing modulo-2 addition of the first code sequence and a delayed version of the first code sequence, and wherein the step of producing the third code sequence comprises the step of performing modulo-2 addition of the first code sequence and a second delayed version of the first code sequence.

2. An apparatus for code generation in synchronous, multichip rate systems, comprising:
   a code generator adapted to produce a first code sequence having a first bit rate;
   an encoder coupled to the code generator and adapted to receive the first code sequence, the encoder adapted to produce a second code sequence having the first bit rate, and
   a multiplexor coupled to the encoder, the multiplexer adapted to receive the first code sequence and the second code sequence, the multiplexor further adapted to produce an output code sequence having a desired bit rate, wherein the encoder comprises:
      a delay block coupled to the first code sequence, the delay block adapted to produce a delayed first code sequence having a predetermined delay time;
      a modulo-2 addition block coupled to the delay block and to the multiplexor the modulo-2 addition block adapted to perform modulo-2 addition of the first code sequence and the time delayed first code sequence;
      a second delay block coupled to the first code sequence, the second delay block adapted to produce a second delayed first code sequence having a second predetermined delay time; and
      a second modulo-2 addition block coupled to the second delay block and to the multiplexor, the second modulo-2 addition block adapted to perform modulo-2 addition of the first code sequence and the second delayed first code sequence.

3. An apparatus for long code generation in synchronous, multi-hip rate communication systems, comprising:
   a long code generator adapted to produce a first long code sequence having a first bit rate;
   a convolutional encoder coupled to the long code generator and adapted to receive the first long code sequence, the convolutional encoder adapted to produce a second long code sequence having the first bit rate, the convolutional encoder further adapted to produce a third long code sequence having the first bit rate; and a multiplexor coupled to the convolutional encoder, the multiplexor adapted to receive the first long code sequence, the second long code sequence, and the third long code sequence, the multiplexor further adapted to produce an output long code sequence having a desired bit rate, wherein the convolutional encoder comprises:

a first delay block coupled to the first code sequence, the first delay block adapted to produce a delayed first code sequence having a predetermined delay time;

a first modulo-2 addition block coupled to the first delay block, the first modulo-2 addition block adapted to perform modulo-2 addition of the first code sequence and the delayed first code sequence a second delay block coupled to the first code sequence, the second delay block adapted to produce a second delayed first code sequence having a second predetermined delay time; and a second modulo-2 addition block coupled to the second delay block and to the multiplexor, the second modulo-2 addition block coupled to perform modulo-2 addition of the first code sequence and the second delayed first code sequence.

* * * * *

UNITED STATES PATENT AND TRADEMARK OFFICE
CERTIFICATE OF CORRECTION

PATENT NO. : 6,724,778 B1  Page 1 of 1
DATED : April 20, 2004
INVENTOR(S) : Laird et al.

It is certified that error appears in the above-identified patent and that said Letters Patent is hereby corrected as shown below:

Column 4,
Line 63, reads "multi-hip", should read -- multi-chip --.

Signed and Sealed this

First Day of June, 2004

JON W. DUDAS
*Acting Director of the United States Patent and Trademark Office*